United States Patent [19]
Loomis

[11] Patent Number: 5,420,422
[45] Date of Patent: May 30, 1995

[54] METHODS AND APPARATUS FOR EPITHERMAL NEUTRON POROSITY LOGGING

[75] Inventor: William A. Loomis, Ridgefield, Conn.

[73] Assignee: Schlumberger Technology Corporation, Ridgefield, Conn.

[21] Appl. No.: 179,787

[22] Filed: Jan. 11, 1994

[51] Int. Cl.$^6$ ............................................. G01N 5/10
[52] U.S. Cl. ................................ 250/269.4; 250/269.1
[58] Field of Search ................ 250/269.4, 269.1, 269.5

[56] References Cited

U.S. PATENT DOCUMENTS

| | | | |
|---|---|---|---|
| 4,097,737 | 6/1978 | Mills, Jr. ............................ | 250/269.4 |
| 4,266,126 | 5/1981 | Mills, Jr. ............................ | 250/264 |
| 4,625,110 | 11/1986 | Smith, Jr. ........................... | 250/269.4 |
| 4,972,082 | 11/1990 | Loomis et al. ..................... | 250/269.4 |
| 5,051,581 | 9/1991 | Hertzog et al. .................... | 250/266 |
| 5,068,531 | 11/1991 | Allen et al. ........................ | 250/269.4 |

FOREIGN PATENT DOCUMENTS

89-11108 11/1989 WIPO .

*Primary Examiner*—Constantine Hannaher
*Attorney, Agent, or Firm*—Leonard W. Pojunas; Richard G. Berkley

[57] ABSTRACT

The first and second moments of an epithermal neutron slowing down time curve are determined and are combined in accordance with a predetermined empirical relationship to derive a raw measurement of the porosity of an earth formation surrounding a borehole. The raw porosity value is then combined with the second moment in accordance with further predetermined empirical relationships to derive a standoff measurement and a standoff-correction factor to be applied to the raw porosity measurement to produce a standoff-corrected porosity measurement. Where the raw porosity value changes appreciably from depth level to depth level, a differential spatial filter is applied to the raw porosity measurement and to the standoff-correction factor to provide a more precise standoff-corrected porosity measurement.

36 Claims, 5 Drawing Sheets

METHODS AND APPARATUS FOR EPITHERMAL NEUTRON POROSITY LOGGING

BACKGROUND OF THE INVENTION

The present invention relates generally to epithermal neutron well logging and, more particularly, to improved methods and apparatus for determining the porosities of subsurface earth formations by means of a robust moments analysis of epithermal neutron slowing down time data.

The Prior Art

Epithermal neutron slowing down time data are typically recorded in the form of multichannel scaler counts observed from one or more epithermal neutron detectors. The data represents the number of counts/channel observed in the detector(s) as a function of time following a high energy neutron burst. Heretofore, such time curve data have principally been analyzed by fitting multiparameter functions to the data on the assumption that the epithermal neutron population decays exponentially.

For example, U.S. Pat. Nos. 4,097,737 and 4,266,126 to Mills disclose the measurement of epithermal neutron slowing down time data in a plurality of successive time gates between neutron bursts and the comparison of ratios of count rates from successive gates to identify the time gates falling on the presumptively exponential (linear) portion of the time curve. The time gates thus identified are used to derive the epithermal neutron decay time of the irradiated earth formation on the basis of a single exponential decay function. An indication of the porosity of the formation is derived from the decay time measurement.

In U.S. Pat. No. 4,625,110, Smith discloses an epithermal neutron porosity logging system in which both early and later parts of the epithermal neutron time curve following relatively short neutron bursts are detected and analyzed (by least-squares best fitting) on the basis that the detected curve represents the sum of two substantially independent neutron populations, one in the borehole and one in the formation, which are assumed to decay exponentially at different rates.

These prior techniques work well where the epithermal neutron time curve is essentially exponential in form. Where, however, the measured curve is more complex, the detailed form of the curve cannot be readily derived from theory and is only approximately exponential. In such cases, the bare use of single or multi-exponential fits often does not give stable answers. The difficulties are further exacerbated when dealing with actual logging data, which typically is much poorer statistically than is laboratory data. The uniqueness of multiparameter fits to statistically poor data is always of questionable reliability.

The more recent U.S. Pat. No. 4,972,082 to Loomis et al. discloses a basically different approach to the parameterization of epithermal neutron time curves. In the '082 patent, the measured time curve is fitted with a nonexponential multiparameter function including one time-constant parameter (representative of the formation epithermal decay time) and at least one additional term representative of detector standoff effects. Although this technique is not subject to the limitations of the prior multi-exponential fitting models insofar as accuracy in modeling complex time curves is concerned, it is subject to the aforementioned problem of uniqueness of fit when used with statistically poor data.

Still more recently, in U.S. Pat. No. 5,068,531 to Allen et al., the epithermal neutron time curve is modelled as the sum of three exponentially decaying components, (1) the epithermal neutron population in the borehole, (2) the epithermal neutron population in the formation, and (3) the thermal neutron background. Three exponentially weighted signal (data) moments and three exponentially weighted model moments are determined, equated and solved to derive the formation epithermal neutron decay time constant ($\mu_2$) and the ratio of amplitudes ($A_1/A_2$) of the borehole decay component and the formation decay component in the detected decay curve. A standoff-compensated value of the formation epithermal neutron decay time constant ($\mu_2$) is then determined from an empirically derived relationship relating the measured $A_1/A_2$ ratio and $\mu_2$ values. This standoff-compensated decay time value is then further converted, in accordance with a further empirical relationship, to a porosity value.

A shortcoming of this technique is that a cumbersome mathematical model of the measured time curves is constructed and adjusted to match the actual measured time curves. Since the actual time curves are only approximately a simple sum of exponentials the data is not perfectly matched by the model. As a result, useful data in the actual time curves is frequently excluded from the curve fitting or equation solving procedure because it does not match the model well.

Also, in the aforementioned prior art techniques, the parameters of the model, adjusted to match the data, are used as the derived porosity and standoff of the formation. The behavior of model parameters, or curve fitting parameters, when the statistical quality of the measured time curve is poor is such as to not give stable answers. Further, calculation of the statistical precision of the matched parameters is not straightforward.

SUMMARY OF THE INVENTION

The foregoing and other disadvantages of the prior art are overcome, in accordance with the invention, by the provision of methods and apparatus for irradiating earth formations with bursts of high energy neutrons, detecting the magnitude of the epithermal neutron populations in a plurality of time gates following the neutron bursts to produce an epithermal neutron slowing down time curve at one or more depth levels in the borehole, deriving the first and second moments of the slowing down time curve at each depth level of interest, deriving from the first moment, in accordance with a first predetermined empirical relationship, a raw measurement of the porosity of the earth formation at that depth level, and combining the second moment with the raw porosity measurement, in accordance with a second predetermined relationship, to derive a correction factor to compensate the raw porosity measurement for the effect thereon of detector standoff. A standoff-corrected measurement of porosity is then derived by combining the raw porosity measurement and the standoff-correction factor. Additionally, the second moment and the raw porosity measurement are combined, in accordance with a further predetermined relationship, to derive a measurement of detector standoff.

Where the raw porosity measurement remains relatively uniform from depth level to depth level, the raw porosity measurement is preferably recorded as the log value of porosity on the assumption that standoff effects are negligible or have not unduly perturbed the raw porosity measurement. Where the raw porosity measurement changes appreciably, however, a spatial depth filter is preferably applied to the raw porosity measurements and the corresponding standoff-correction factors to produce filtered values of the raw porosity and the standoff-porosity correction factor. These filtered values are then combined to provide standoff-corrected porosity measurements.

In accordance with the invention, the empirical relationships used to derive the raw porosity measurements and the standoff-porosity correction factors from the first and second moments are determined by analyzing an epithermal neutron slowing down time data base representing known values of porosity, lithology and standoff. Once determined, these predetermined empirical relationships allow the raw porosity measurements and the standoff-porosity correction factors to be derived directly from the first and second moments of a detected slowing down time curve without resort to the curve fitting techniques of the prior art and in a way which maximizes the statistical precision of the measurements.

As the present invention does not rely on a data model, it is able to use more of the measured time curves, thereby increasing precision. In accordance with the invention, the moments are calculated directly from the measured time curves and are robust quantities even when there are very few counts in the time curves. Porosity and standoff are then derived directly from the moments without an intervening step of curve fitting or equation solving. Moreover, the statistical fluctuations of the calculated moments are straightforward to calculate, so that the statistical errors in the derived porosity and standoff may be simply determined.

BRIEF DESCRIPTION OF THE DRAWINGS

For a better understanding of the invention, reference may be made to the following description of exemplary embodiments thereof, taken in conjunction with the accompanying drawings, in which.

DETAILED DESCRIPTION OF AN ILLUSTRATED EMBODIMENT

Figure 1:
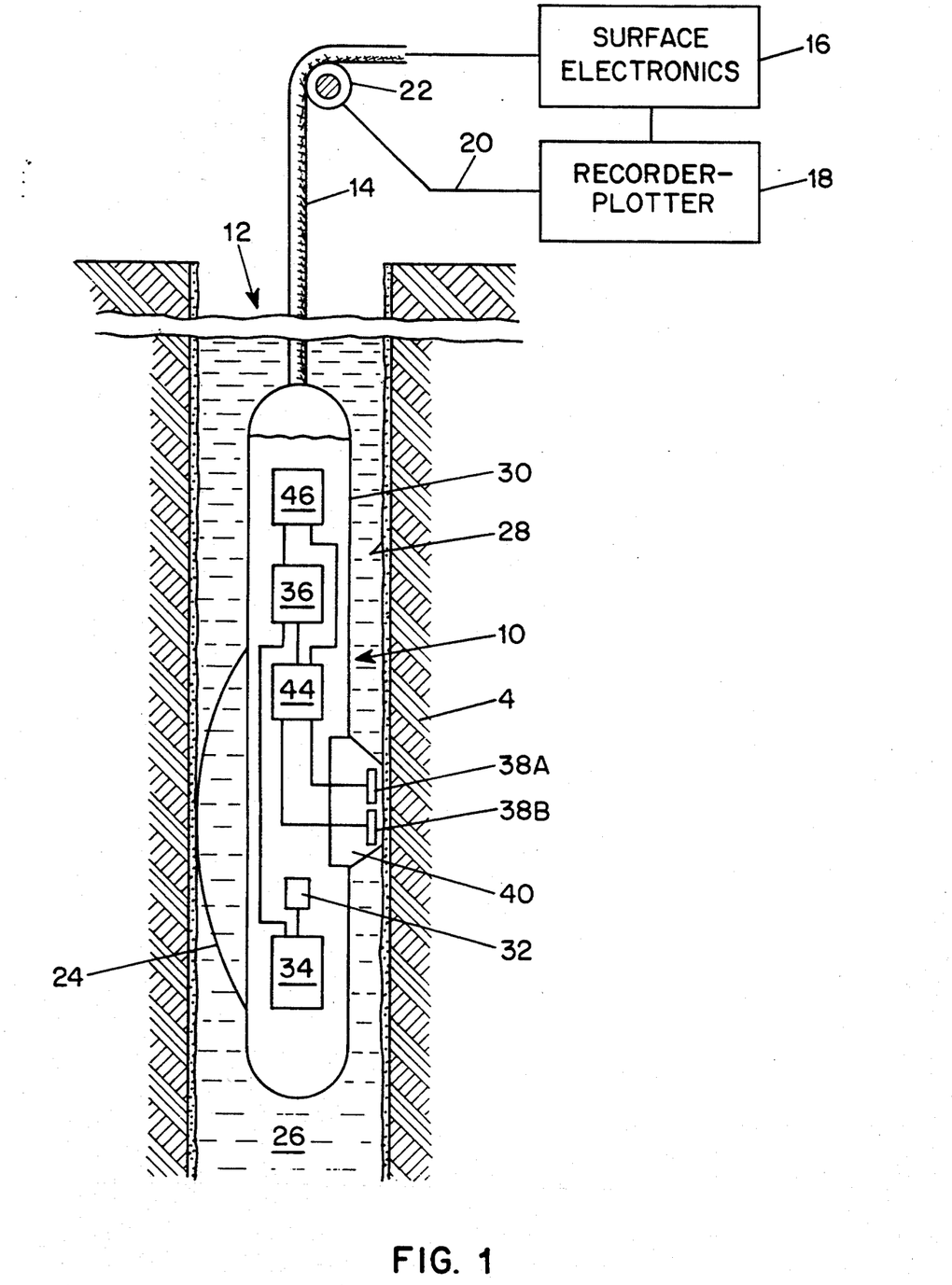
FIG. 1 is a schematic illustration of one embodiment of well logging apparatus for measuring epithermal neutron time curve data in a borehole and for producing a porosity versus depth log therefrom.

In the illustrative embodiment of the invention depicted in FIG. 1, a well logging apparatus for performing epithermal neutron porosity logging of subsurface earth formations in accordance with the invention is illustrated as including a downhole sonde 10 suspended in a borehole 12 by an armored cable 14. The cable 14 connects the downhole sonde to surface equipment including a surface electronics package 16, preferably comprising a truck or skid-mounted digital computer and associated peripherals, and a recorder-plotter 18 for making the customary visual and/or magnetic record of the measured data and parameters vs. depth in the well bore. For that purpose, the recorder/plotter 18 is electrically or mechanically coupled, as indicated schematically by the line 20, to a cable-following sheave wheel 22.

The sonde 10 is intended to be a sidewall tool, and therefore a bow spring 24 or other decentralizing device is provided to urge the sonde against the sidewall of the borehole 12. The borehole 12 is illustrated as an open hole, containing a fluid 26 and having a mud cake 28 formed on the wall thereof. Although the tool is primarily intended for open-hole logging, it may be used in cased holes as well. The sonde 10 includes a pressure and temperature resistant housing 30 which includes, preferably adjacent the lower end thereof, a pulsed neutron generator 32 and an associated control and high-voltage power supply section 34. The neutron generator 32 preferably is of the deuterium-tritium accelerator type known in the art, see, for example, U.S. Pat. No. 2,991,364 to Goodman and U.S. Pat. No. 3,546,512 to Frentrop. The pertinent portions of the '364 and '512 patents are incorporated herein by reference. Signals for controlling the operation of the neutron generator 32 and high-voltage section 34 are transmitted to those units from a sonde programmer section 36, as is described more fully hereinafter.

One or more detectors 38A and 38B are mounted in a pad 40 on the exterior of the sonde 10 diametrically opposite the bow spring 24. The pad 40 is shaped to cut into the mudcake 28 to position the detector(s) close to the borehole wall so as to reduce the mudcake effect, which can be large for epithermal neutron slowing down time data measurements. The detectors 38A and 38B preferably comprise He 3 detectors which are clad in cadmium or other material to isolate them from thermal neutrons and which are shielded on all sides except the formation side against borehole neutrons. Suitable configurations and compositions of the detectors, shielding materials and pad are disclosed in U.S. Pat. No. 4,760,252 to Albats et al. and U.S. Pat. No. 4,972,082 to Loomis et al., the pertinent portions of which are incorporated herein by reference. Instead of being pad-mounted as in FIG. 1, the detector(s) may also be enclosed within the sonde housing 30 as shown in the aforementioned Albats et al. U.S. Pat. No. 4,760,252. Alternatively, the detector-bearing pad 40 may be carried by an extendable arm articulated to the sonde housing 30, in which case the bow spring 24 might be replaced with a backup arm similarly articulated to the housing 30.

The output pulses produced by the detectors 38A and 38B are supplied to an electronics section 44 where they are amplified and digitized for application to the telemetry section 46 for transmission over the cable 14 to the surface electronics package 16. Where more than one detector is provided, the output signals from the respective detectors are preferably processed and transmitted to the surface separately from the signals from the other detectors. If desired, the detector signals may be combined at the surface to provide statistically better data, or the signals from each detector may be analyzed separately.

Figure 2:
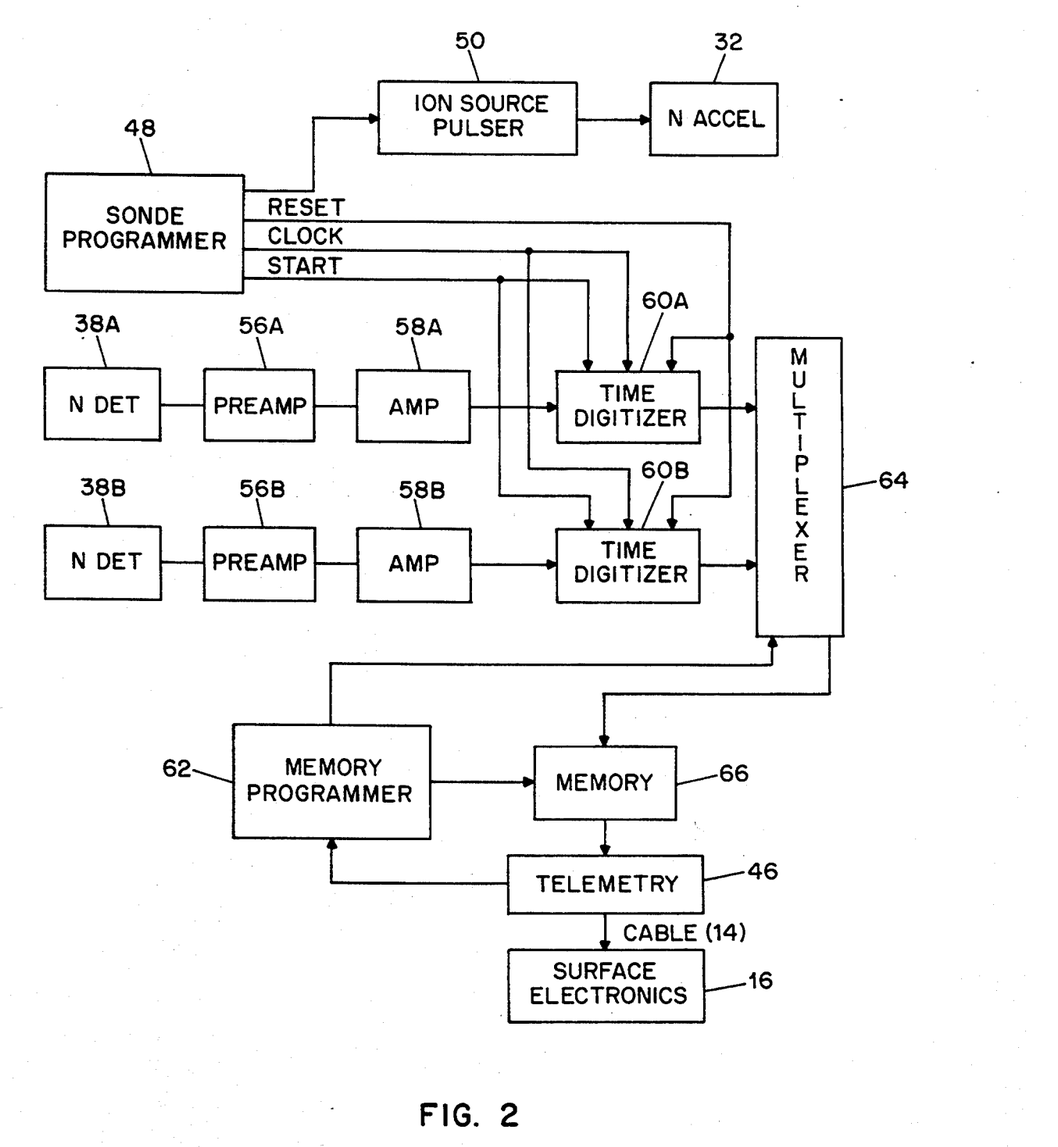
FIG. 2 illustrates the downhole and surface electronics of the apparatus of FIG. 1.

With reference to FIG. 2, there is shown the downhole electronics and the surface electronics for processing the detector output signals and for producing a standoff-corrected porosity log in accordance with the invention. An example of an epithermal neutron showing down time curve as might be measured with the electronics of FIG. 2 is shown in FIG. 3.

Each burst-measurement cycle is initiated by the sonde programmer 48 transmitting a reference time pulse to the ion source pulser 50, which in turn generates an ion source pulse for application to the ion source (not shown) in the neutron generator 32 (see FIG. 1). The ion source pulse causes the neutron generator 32 to emit a burst of 14 MeV neutrons 52 of approximately rectangular cross section (FIG. 3).

For maximum precision in measuring the epithermal neutron slowing down time data, the output of the neutron generator 32 should be as high as possible, but preferably should be confined to a burst width that is on the order of, or less than, the slowing down times of the earth formations expected to be encountered in actual logging conditions. Slowing down times for commercially significant formations typically vary over the approximate range of from 2 to 20 microseconds. For purposes of the present invention, a preferred burst timing regime for the neutron generator 32 is a burst width of approximately 10 microseconds repeated at a rate of approximately 25 Khz. Other burst widths and repetition rates may of course be used.

Figure 3:
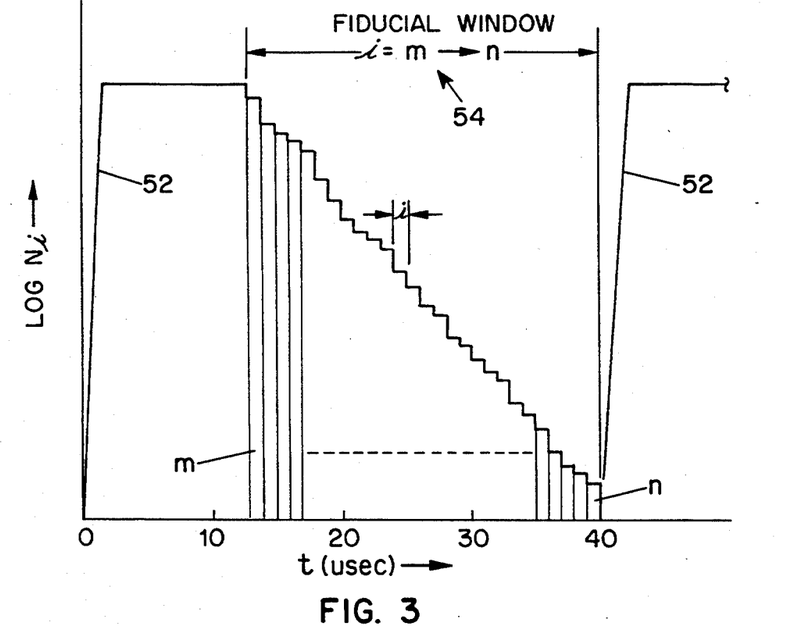
FIG. 3 represents an example of an epithermal neutron time curve as might be measured by the apparatus of FIGS. 1 and 2.

As illustrated in FIG. 3, the epithermal neutron population created by interaction of the high energy neutrons emitted during the neutron burst with the materials in the borehole 12 and the surrounding formation is detected in a plurality of time gates i spanning a fiducial time window 54 following the neutron burst. The duration of the fiducial time window 54 may be selected as desired, and preferably is of sufficient length to span the decay of the epithermal neutron population from a time closely following the neutron burst at which the early borehole effects have substantially disappeared to a time at which the decay has substantially reached the level of thermal neutron background. As previously mentioned, it is an advantage of the present invention relative to the prior art that, as the invention does not rely on a model matching the measured data, more borehole-affected data may be used. The fiducial window 54 is equally divided into a plurality of time gates i. In the example of FIG. 3, the time gates i are of 1-microsecond duration, with the first time gate i=m beginning 13 microseconds after burst initiation and the last time gate i=n beginning at 39 microseconds after burst initiation, for a total fiducial time window duration of 27 microseconds.

As shown in FIG. 2, the output pulses from each detector 38A, 38B are applied to a pre-amplifier 56A, 56B, amplifier 58A, 58B and time digitizer 60A, 60B to produce separate time curve data as in FIG. 3 for each detector. The time digitizer is armed by a START pulse from the programmer 48, which is synchronized with the ion source pulse and occurs slightly before the neutron burst. CLOCK pulses from the programmer determine the widths of the time channels i, and the input pulses from the amplifiers 58A, 58B stop the CLOCK pulse counters in the digitizers 60A, 60B to digitize the time intervals from the START pulse to the detector input pulses. At the end of the desired data measurement interval, the digitizers 60A, 60B are reset to zero and the counts per channel data are read out by a RESET pulse from the programmer 48. Under control of a memory programmer 62 in the electronics section 44, the output signals (counts per channel) from the time digitizers 60A, 60B are multiplexed at 64 and are applied to a digital read-write memory 66 in the downhole electronics section 44. Each time channel is assigned a memory address, and the addresses from an individual signal channel are contiguous. Histogramming of the data from a signal channel is achieved by incrementing the number stored at a given address by one every time a new signal occurs in the corresponding time channel. Counts per channel data from the neutron detectors 38A, 38B are accumulated in the downhole memory 66 for a predetermined time interval, e.g., one second, and are then destructively read out of memory by the memory programmer 62, applied to the downhole telemetry section 46, and transmitted serially over the logging cable 14 to the uphole telemetry section (not shown) in the surface electronics package 16. The counts per channel data from the uphole telemetry section are accumulated in buffer storage (not shown) included as part of a general purpose digital computer in the surface electronics 16, so as to acquire the epithermal neutron time curve data over a desired accumulation time interval, which may be selected, for example, to correspond to a specific interval of depth according to the logging speed of the downhole sonde 10.

Suitable circuitry for the downhole electronics section 44 is disclosed in more detail in the U.S. Pat. No. 4,012,712 to Nelligan, except that the pulse height analyzer described in that patent would be replaced by a time digitizer. The telemetry sections may be constructed as described in the Nelligan '712 patent or as described in U.S. Pat. No. 4,355,310 to Belaigues et al. The pertinent portions of the '712 and '310 patents are incorporated herein by reference.

In accordance with the present invention, the first and second moments of the measured epithermal neutron time curves, as in FIG. 3, are determined and directly related empirically to the formation porosity and to detector standoff. This yields log values for both porosity and standoff, as well as a standoff-induced porosity correction from which a standoff-corrected porosity measurement is derived. An advantage of this technique relative to the aforementioned prior art solutions is that the statistical fluctuations of the moments are easy to calculate, which in turn simplifies error calculations for the derived quantities.

Calculation of the moments of the decaying part of time curve, such as is illustrated in FIG. 3, lends itself well to extracting the desired information from the time curve. This follows from the approximately exponential nature of the time curves and from the fact that the average time constant of the time curves is inversely proportional to the formation porosity. For a pure exponential decay over an infinite time interval the first moment of the time curve is given by:

$$\langle t \rangle = \int_0^\infty t N(t) dt = \tau \tag{1}$$

where $$\int_0^\infty N(t) dt = 1$$

and $N(t) = Ae^{-t/\tau}$ and $\rangle t \leq$ is just the time constant $\tau$. The second moment is:

$$\langle t^2 \rangle = \int_0^\infty t^2 N(t) dt = 2\tau^2 \tag{2}$$

and is twice the square of the time constant, so that:

$$\frac{\langle t^2 \rangle}{(\langle t \rangle)^2} = 2 \tag{3}$$

Actual slowing down time data is more complicated than a simple exponential or sum of exponentials, having in fact a continuous spectrum of exponential components as well as statistical noise. Standoff affects the time curves by increasing the early decay rate relative to the late part of the curves. Further, in practice the moments can only be computed over a finite interval. These effects, however, do not obscure the basic picture sketched by Equations 1–3.

Figure 4:
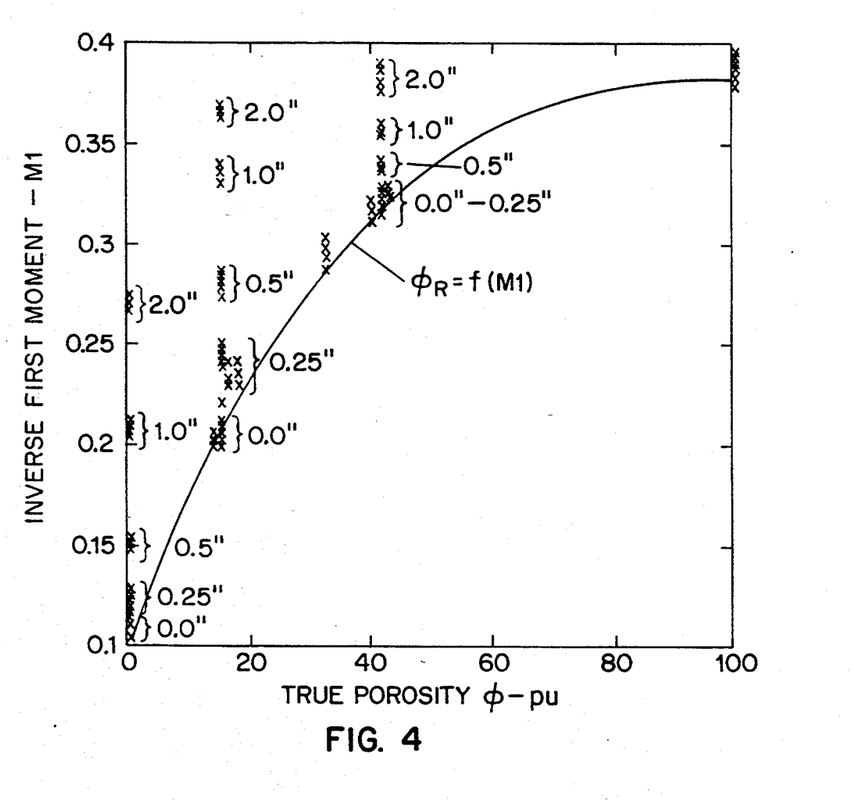
FIG. 4 is a graph showing the inverse first moment M1 to raw porosity transform f(M1) in accordance with the invention for the data of FIG. 4.
Figure 5:
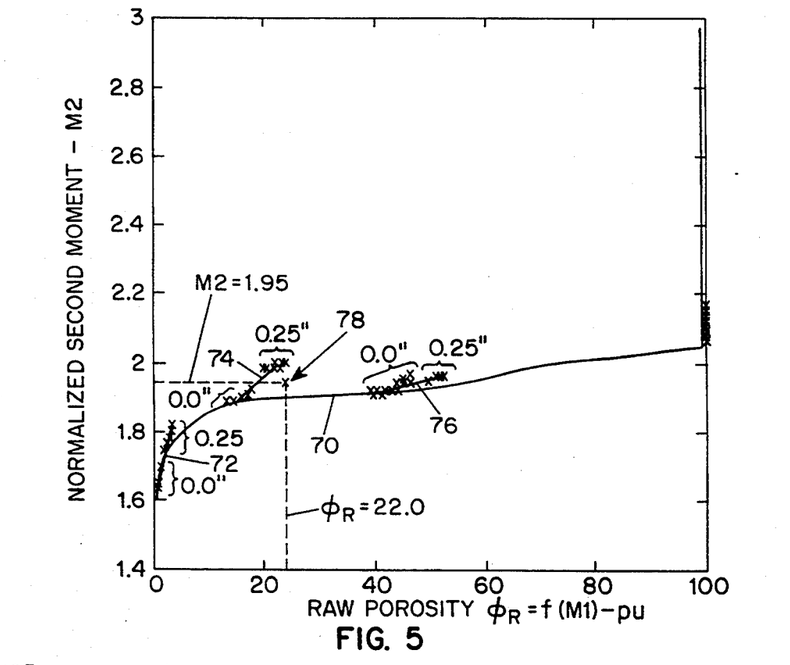
FIG. 5 is a cross plot of the normalized second moment M2 versus raw porosity $\phi R$ for the data of FIG. 4, from which a standoff measurement and the resultant porosity correction are determined in accordance with the invention.
Figure 6:
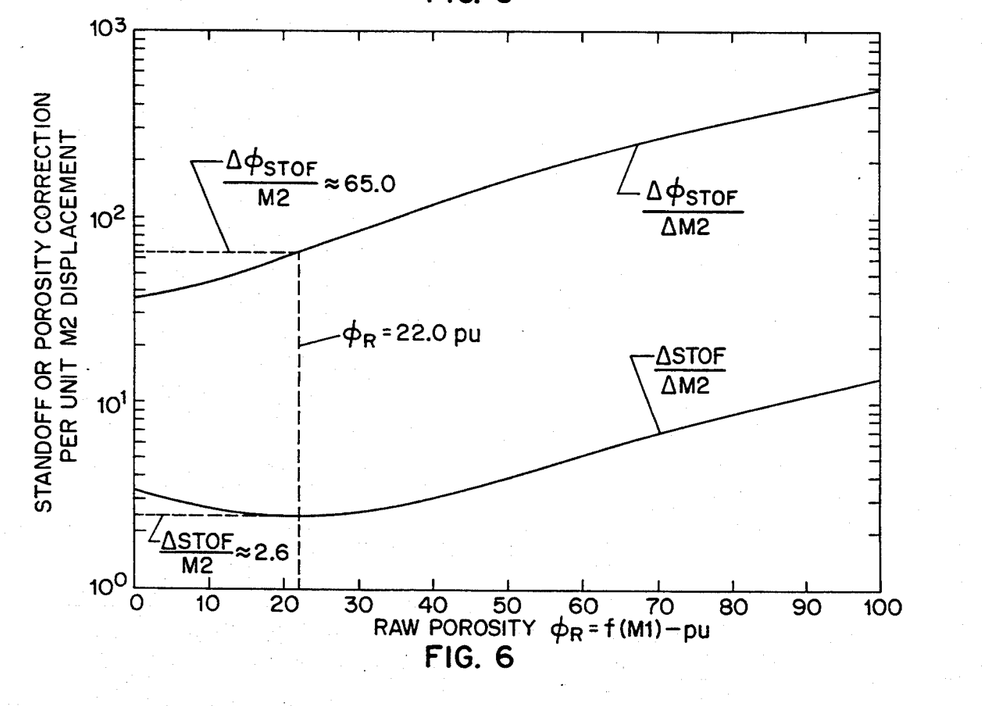
FIG. 6 is a cross plot showing the empirical curves for determining the change in standoff and the change in porosity as a function of unit M2 displacement from the zero standoff curve in FIG. 5.

FIGS. 4–6 illustrate the results of an analysis of an actual slowing down time database by computing the moments as above over a fixed interval in the decaying part of the time curves. The answers are expressed in terms of M1, the inverse first moment:

$$M1 = \frac{1}{\langle t \rangle} \tag{4}$$

and the normalized second moment M2:

$$M2 = \frac{\langle t^2 \rangle}{(\langle t \rangle)^2} \tag{5}$$

The slowing down time database analyzed in FIGS. 4–6 was taken using two cadmium shielded He 3 detectors and a 14 MeV neutron accelerator pulsed at approximately 25 Khz with a burst width of approximately 10 microseconds. The fiducial window was 27 microseconds long beginning at the end of the neutron burst. The data were taken in test pits simulating 0, 15.4, 41.7, and 100 pu porosity sandstone, limestone and dolomite lithologies and at detector standoffs of 0.0", 0.25", 0.5", 1.0" and 2.0" each The time curve data were typically accumulated for periods on the order 300 seconds and were taken at four azimuth points around the borehole (north, south, east and west), so there were four time curves for each combination of lithology, porosity and standoff. No attempt was made to subtract thermal neutron background from the data, which reflects the fact that for logging data the thermal neutron background count rate is only on the order of 0.1 counts/channel.

The moments method of the invention was used to generate porosity and standoff information for the database time curves, as follows.

First, for each time curve, the first and second moments were determined and the inverse first moment M1 and the normalized second moment M2 were computed as in Eqs. (1)–(5).

Next, a predetermined relationship was established between M1 and a raw porosity $\phi_R$ by cross plotting the inverse first moment M1 for each data point (lithology, porosity, standoff) against the known or true porosity value for that point. A porosity transform or function f(M1) empirically relating M1 to porosity was then generated, as shown graphically in FIG. 4, by fitting a smooth curve through the zero standoff points for the respective known porosities, i.e.:

$$\phi_R = f(M1) \tag{6}$$

The underlying software for generating f(M1) was written in MATLAB, a commercially available software package sold by MathWorks, Inc., Cochituate Place, 24 Prime Parkway, South Natick, MA, in which this step is extremely simple as is also the function required to interpret the curve. The data points in FIG. 4 with M1 values above the smooth curve represent data at nonzero standoff.

Next, M2 and $\phi_R = f(M1)$ were cross plotted as in FIG. 5 to obtain information as to the magnitude of detector standoff STOF and the magnitude of the standoff-induced porosity correction $\Delta\phi_{STOF}$ required to compensate the raw porosity measurement for standoff. The smooth curve or transform 70 in FIG. 5 represents the spine and the lines 72, 74 and 76 represent the standoff ribs for 0, 15.4 and 41.7 pu porosities, respectively, when standoff was permitted to vary from 0.0" to 0.25". Using the standoff ribs 72, 74 and 76 as a calibration, the magnitude of detector standoff and the magnitude of the resulting porosity correction were determined from the vertical (M2) displacement of an individual measurement pair $\phi_R$, M2 from the spine 70. The angle of each standoff rib 72, 74 and 76 to the spine 70 is porosity dependent. Thus, the standoff measurement and the porosity correction have the functional forms:

$$STOF = g(f(M1)) \times (M2 \text{ displacement from spine}) \tag{7}$$

$$\Delta\phi_{STOF} = h(f(M1)) \times (M2 \text{ displacement from spine}) \tag{8}$$

These functions are also readily generated in MATLAB from the data plotted versus the raw porosity in FIG. 5. The functions are plotted in smoothed form in FIG. 6 per unit M2 displacement ($\Delta M2$) from the zero standoff curve 70 in FIG. 5.

Combining Eqs. (6) and (8), the corrected porosity then becomes:

$$\phi = (f(M1)) - \Delta\phi_{STOF} \tag{9}$$

With reference to FIGS. 5 and 6, the magnitude of the correction factor to the raw porosity measurement $\phi_R$ due to M2 displacement or standoff can be seen. For example, if the raw porosity $\phi_R$ derived from Eq. (6) is 22.0 pu and if the normalized second moment M2 as determined from Eq. (5) is 1.95, the resulting data point 78 on FIG. 5 will be displaced off the spine 70 by $\approx 0.05$. The correction $\Delta\phi_{STOF}$ to the raw porosity for such M2 displacement is the value of $\Delta\phi_{STOF}/M2$ at 22.0 pu from FIG. 6, i.e., $\approx 65$, times $0.05 = \approx 3.25$. Eq. (8). The corrected porosity, therefore is $22.0 - 3.25 = \approx 18.75$ pu. Eq. (9).

Similarly, the magnitude of the standoff STOF is determined to be the value of $\Delta STOF/M2$ from FIG. 6, i.e. $\approx 2.6$, times $0.05 = \approx 0.13$ inches.

Figure 7:
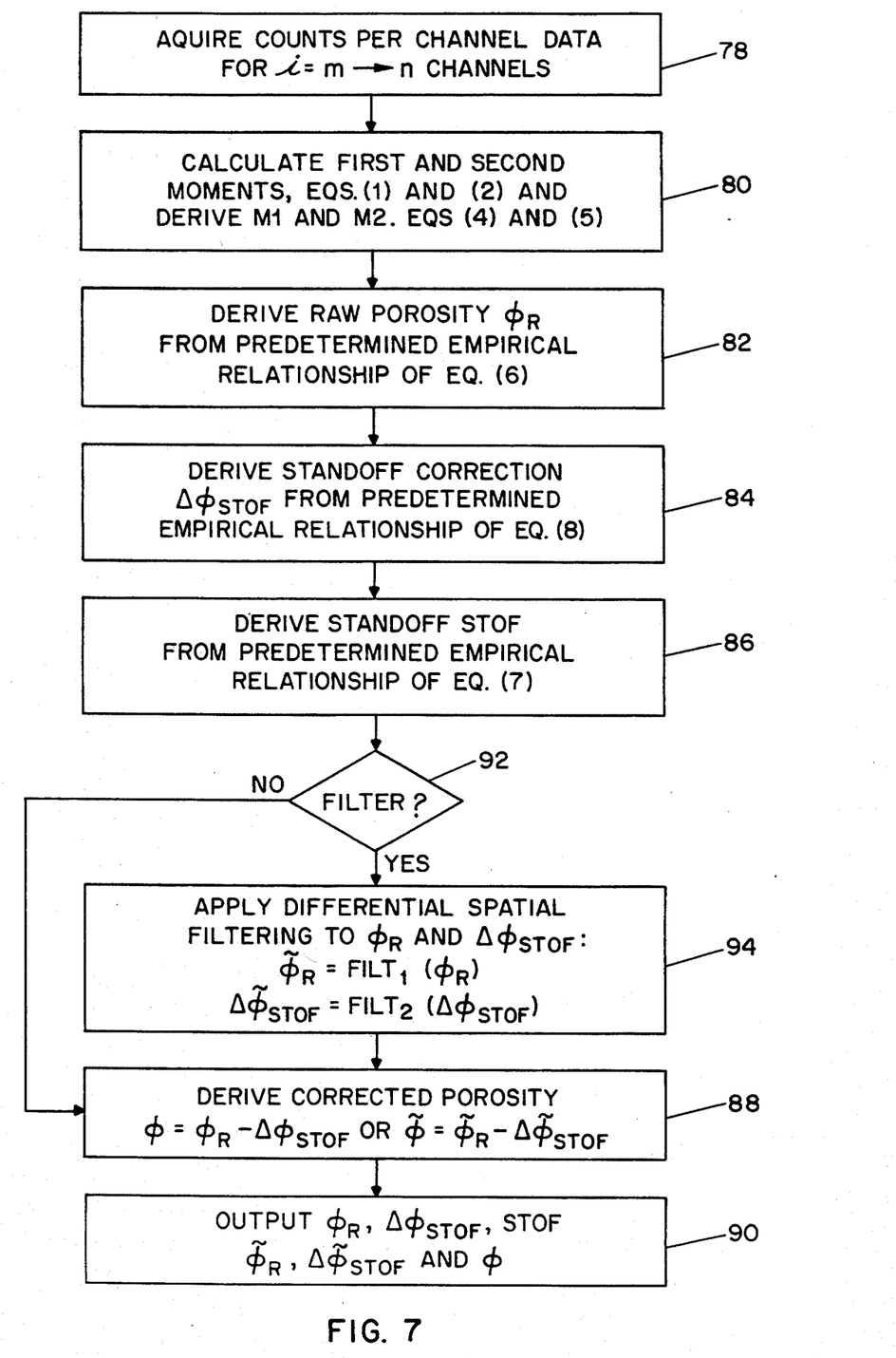
FIG. 7 is a flow chart representing the steps carried out in accordance with the invention for deriving a standoff-corrected porosity measurement from the first and second moments of a measured epithermal neutron slow downtime curve.

Having established the relationships of Eqs. (6), (7) and (8) based on a database analysis as described above, such predetermined relationships may then be employed to derive standoff and standoff-corrected porosity measurements under actual logging conditions. The flow chart of FIG. 7 illustrates how this would be carried out in practice with the apparatus of FIGS. 1 and 2. As will be understood, this can be done in real time while logging or it can be done at a remote site working with previously recorded data.

The first step 78 is to acquire the counts per channel data ($i=m\rightarrow n$) over the time interval to be analyzed. In real time, the time curve is accumulated downhole in the memory 66, telemetered to the surface at predetermined time intervals, and acquired in the surface data acquisition buffers for a time period corresponding to a desired depth interval, e.g. 2 inches. The data for each depth level is then read out to the digital computer in the surface electronics 16, where, in step 80, the first and second moments, the inverse first moment M1 and the normalized second moment M2 are calculated for that depth level in accordance with Eqs. (1)–(5). Of course, where the time curve data had been previously recorded, the data acquisition step 78 simply involves reading the data for the depth level in question from storage.

Then, in step 82, the raw porosity $\phi_R$ is determined pursuant to the predetermined empirical relationship of FIG. 4 and Eq. (6). In step 84, the porosity correction $\Delta\phi_{STOF}$ due to detector standoff is determined using the empirical relationship of FIGS. 5 and 6 and Eq. (8), and in step 86, the standoff STOF itself is determined from the empirical relationship established in FIGS. 5 and 6 and Eq. (7).

At this point, the corrected porosity measurement $\phi$ may be determined directly from the raw porosity measurement $\phi_R$ and the standoff-porosity correction $\Delta\phi_{STOF}$, as indicated at step 88. If so, the corrected porosity $\phi$, the standoff STOF and, if desired, any of the other derived quantities $\phi_R$, $\Delta\phi_{STOF}$, M1 and M2 may be read out, at step 90, to the recorder/plotter 18 for recording as a function of depth in the borehole.

The preferred log presentation is both the raw porosity $\phi_R$ and the standoff-induced porosity correction $\Delta\phi_{STOF}$. This is because the precision (repeatability) of the raw porosity $\phi_R$ is good, whereas the statistical error of the porosity correction $\Delta\phi_{STOF}$ is about 2.5 times as large as the statistical error of $\phi_R$. Hence calculating the standoff-corrected porosity $\phi$ on a depth-by-depth basis produces a more accurate, but less precise, porosity than using the raw (uncorrected) porosity and assuming zero standoff.

The statistical precision of $\Delta\phi_{STOF}$ can be improved by increasing the counts/channel, but often at the cost of decreased logging speed. As a further feature of the invention, it has been found that spatial filtering of the raw porosity $\phi_R$ and the standoff-porosity correction $\Delta\phi_{STOF}$ using respectively different spatial filters provides improved results while maintaining desired logging speeds and good vertical resolution.

Merely averaging the standoff-corrected formation porosity $\phi$ over depth is not a desirable approach because vertical resolution is degraded. On the other hand, averaging only the standoff-porosity correction $\Delta\phi_{STOF}$, while reasonable because of its poorer statistical precision, could leave an unwanted rugosity signal in the corrected porosity $\phi$. This problem is dealt with, in accordance with the invention, by monitoring the raw porosity $\phi_R$ signal and varying the amount of depth averaging of $\phi_R$ and $\Delta\phi_{STOF}$ when the change in $\phi_R$ exceeds a certain level.

Both standoff and formation porosity changes will appear in the raw porosity $\phi_R$ signal unless they are correlated in an unlikely way. Thus in regions where the raw porosity $\phi_R$ is relatively constant, it is reasonable to average $\phi_R$ and/or $\Delta\phi_{STOF}$ over a larger depth interval than in regions where large changes in $\phi_R$ occur. When changes of several standard deviations occur in $\phi_R$, the respective depths over which $\phi_R$ and $\Delta\phi_{STOF}$ are averaged are decreased.

An example of this feature of the invention uses variable width gaussian filters FILT$_1$ and FILT$_2$ having respectively normal RMS standard deviations $\sigma 1$ of twice the depth interval sampled and $\sigma 2$ of eight times the depth interval sampled. FILT$_1$ is applied to $\phi_R$ and FILT$_2$ to $\Delta\phi_{STOF}$. Where appreciable change in $\phi_R$ occurs over a short vertical interval, however, both filters have their standard deviations proportionately narrowed. For example, if $\phi_R$ changes by three or more standard deviations from one depth level to the next (or over a few adjoining depth levels), the filter widths could be reduced from $\sigma 1 = 4$ inches and $\sigma 2 = 16$ inches to $\sigma 1 = 1.2$ inches and $\sigma 2 = 4.8$ inches, assuming the depth interval sampled is 2 inches.

The test to determine whether differential spatial filtering is to be employed is indicated at 92 in FIG. 7, and may be made based as aforementioned on whether $\phi_R$ has changed from the prior depth level by more than a predetermined number of standard deviations, e.g. three. If yes, $\phi_R$ and $\Delta\phi_{STOF}$ are filtered in step 94 by variable width gaussian filters FILT$_1$ and FILT$_2$, respectively, to produce the averaged raw porosity $\bar{\phi}_R$ and standoff-porosity correction $\overline{\Delta\phi_{STOF}}$ measurements. $\bar{\phi}_R$ and $\overline{\Delta\phi_{STOF}}$ are then used at step 88 to derive the averaged corrected porosity $\bar{\phi}$. The averaged $\bar{\phi}_R$, $\overline{\Delta\phi_{STOF}}$ and $\bar{\phi}$ values are then output at step 90 to the recorder plotter 18.

Although the invention has been described herein by reference to representative embodiments thereof, it will be understood that such embodiments are susceptible of variation and modification without departing from the inventive concepts disclosed. All such variations and modifications, therefore, are intended to be included within the spirit and scope of the appended claims.

I claim:

1. A method for investigating the porosity of subsurface earth formations surrounding a borehole, comprising:
   (a) repetitively irradiating the borehole and a surrounding earth formation with discrete bursts of high energy neutrons, which neutrons interact with nuclei of the materials in the borehole and the formation to produce therein populations of epithermal neutrons;
   (b) detecting the magnitude of the epithermal neutron population in a plurality of time gates following each neutron burst and generating a corresponding plurality of count signals representative thereof;
   (c) accumulating said count signals over a predetermined time interval to produce an epithermal slowing down time curve;
   (d) deriving the first moment and the second moment of said slowing down time curve;

(e) deriving from said first moment, in accordance with a predetermined empirical relationship, a raw measurement of the porosity of the irradiated earth formation; and (f) combining said second moment and said raw porosity measurement, in accordance with a second predetermined empirical relationship, to derive a correction factor to said raw porosity measurement to compensate for detector standoff from the borehole wall.

2. The method of claim 1, further comprising the step of recording said raw porosity measurement and said standoff-correction factor as a function of depth.

3. The method of claim 1, further comprising the step of combining said standoff-correction factor and said raw porosity measurement to derive a stand off-corrected porosity measurement.

4. The method of claim 3, further comprising the step of recording said standoff-corrected porosity measurement as a function of depth.

5. The method of claim 1, further comprising the step of combining said second moment and said raw porosity measurement, in accordance with a third predetermined empirical relationship, to derive a measurement of detector standoff.

6. The method of claim 1, further comprising the steps of:

repeating steps (a) through (f) at a plurality of different depth levels in the borehole to derive a corresponding plurality of raw porosity measurements and standoff-connector factors; and applying a spatial depth filter to at least a portion of said raw porosity measurements and the corresponding standoff-correction factors to derive filtered raw porosity measurements and filtered standoff-correction factors, respectively.

7. The method of claim 6, further comprising the step of recording said filtered raw porosity measurements and said filtered corresponding standoff-correction factors as a function of depth.

8. The method of claim 6, wherein the filtering step further comprises varying the width of the filter applied to said raw porosity measurements and said standoff-correction factors.

9. The method of claim 8, wherein the filter width is varied when the raw porosity measurement changes by a predetermined amount or more between depth levels.

10. The method of claim 8, wherein the depth filter comprises a variable width gaussian filter.

11. The method of claim 6, further comprising the step of combining said filtered raw porosity measurements and said corresponding filtered standoff-correction factors to derive standoff-corrected porosity measurements.

12. The method of claim 11, further comprising the step of recording said standoff-corrected porosity measurements as a function of depth.

13. Apparatus for investigating the porosity of subsurface earth formations surrounding a borehole, comprising:

(a) means for repetitively irradiating the borehole and a surrounding earth formation with discrete bursts of high energy neutrons, which neutrons interact with nuclei of the materials in the borehole and the formation to produce therein populations of epithermal neutrons;

(b) means for detecting the magnitude of the epithermal neutron population in a plurality of time gates following each neutron burst and generating a corresponding plurality of count signals representative thereof;

(c) means for accumulating said count signals over a predetermined time interval to produce an epithermal slowing down time curve;

(d) means for deriving the first moment and the second moment of said slowing down time curve;

(e) means for deriving from said first moment, in accordance with a predetermined empirical relationship, a raw measurement of the porosity of the irradiated earth formation; and (f) means for combining said second moment and said raw porosity measurement, in accordance with a second predetermined empirical relationship, to derive a correction factor to said raw porosity measurement to compensate for detector standoff from the borehole wall.

14. The apparatus of claim 13, further comprising means for recording said raw porosity measurement and said standoff-correction factor as a function of depth.

15. The apparatus of claim 13, further comprising means for combining said standoff-correction factor and said raw porosity measurement to derive a standoff-corrected porosity measurement.

16. The apparatus of claim 15, further comprising means for recording said standoff-corrected porosity measurement as a function of depth.

17. The apparatus of claim 13, further comprising means for combining said second moment and said raw porosity measurement, in accordance with a third predetermined empirical relationship, to derive a measurement of detector standoff.

18. The apparatus of claim 13, further comprising means for applying a spatial depth filter to a plurality of said raw porosity measurements and the corresponding standoff-correction factors from a corresponding plurality of depth levels in the borehole to derive filtered raw porosity measurements and filtered standoff-correction factors, respectively.

19. The apparatus of claim 18, further comprising means for recording said filtered raw porosity measurements and said filtered corresponding standoff-correction factors as a function of depth.

20. The apparatus of claim 18, wherein the filter-applying means includes means for varying the width of the filter applied to said raw porosity measurements and said standoff-correction factors.

21. The apparatus of claim 20, wherein the filter width varying means varies the filter width when the raw porosity measurement changes by a predetermined amount or more between depth levels.

22. The method of claim 20, wherein the depth filter comprises a variable width gaussian filter.

23. The apparatus of claim 18, further comprising means for combining said filtered raw porosity measurements and said corresponding filtered standoff-correction factors to derive standoff-corrected porosity measurements.

24. The apparatus of claim 23, further comprising means for recording said standoff-corrected porosity measurements as a function of depth.

25. A method for investigating the porosities of earth formations surrounding a borehole by analyzing epithermal neutron slowing down time curve data recorded following irradiation of the formations with high energy neutrons, comprising the steps of:

(a) deriving the first and second moments of an epithermal neutron slowing down time curve corresponding to a particular depth level in the borehole;

(b) deriving from said first moment, in accordance with a predetermined empirical relationship, a raw measurement of the porosity of the earth formation at said depth level; and (c) combining said second moment and said raw porosity measurement, in accordance with a second predetermined empirical relationship, to derive a correction factor to said raw porosity measurement to compensate for detector standoff from the borehole wall.

26. The method of claim 25, further comprising the step of recording said raw porosity measurement and said standoff-correction factor as a function of depth.

27. The method of claim 25, further comprising the step of combining said standoff-correction factor and said raw porosity measurement to derive a standoff-corrected porosity measurement.

28. The method of claim 27, further comprising the step of recording said standoff-corrected porosity measurement as a function of depth.

29. The method of claim 25, further comprising the step of combining said second moment and said raw porosity measurement, in accordance with a third predetermined empirical relationship, to derive a measurement of detector standoff.

30. The method of claim 25, further comprising the steps of:

repeating steps (a) through (c) for a plurality of different depth levels in the borehole to derive a corresponding plurality of raw porosity measurements and standoff-connector factors; and applying a spatial depth filter to at least a portion of said raw porosity measurements and the corresponding standoff-correction factors to derive filtered raw porosity measurements and filtered standoff-correction factors, respectively.

31. The method of claim 30, further comprising the step of recording said filtered raw porosity measurements and said filtered corresponding stand-off-correction factors as a function of depth.

32. The method of claim 30, wherein the filtering step further comprises varying the width of the filter applied to said raw porosity measurements and said standoff-correction factors.

33. The method of claim 32, wherein the filter width is varied when the raw porosity measurement changes by a predetermined amount or more between depth levels.

34. The method of claim 32, wherein the depth filter comprises a variable width gaussian filter.

35. The method of claim 30, further comprising the step of combining said filtered raw porosity measurements and said corresponding filtered stand-off-correction factors to derive standoff-corrected porosity measurements.

36. The method of claim 35, further comprising the step of recording said standoff-corrected porosity measurements as a function of depth.

* * * * *